United States Patent
Liu et al.

(10) Patent No.: US 7,440,173 B2
(45) Date of Patent: Oct. 21, 2008

(54) ALL FIBER LASER SOLUTION FOR SPECTRAL BROADENING AND PULSE STRETCHING IN A CHIRPED PULSE AMPLIFICATION FIBER SYSTEM

(75) Inventors: Jian Liu, Sunnyvale, CA (US); Jiangfan Xia, Santa Clara, CA (US)

(73) Assignee: Polar Onyx, Inc., Sunnyvale, CA (US)

(*) Notice: Subject to any disclaimer, the term of this patent is extended or adjusted under 35 U.S.C. 154(b) by 0 days.

(21) Appl. No.: 11/479,489

(22) Filed: Jun. 30, 2006

(65) Prior Publication Data
US 2007/0002910 A1    Jan. 4, 2007

Related U.S. Application Data

(60) Provisional application No. 60/696,275, filed on Jul. 1, 2005, provisional application No. 60/696,372, filed on Jun. 30, 2005.

(51) Int. Cl.
H04B 10/17 (2006.01)
H01S 3/098 (2006.01)
H01S 3/067 (2006.01)

(52) U.S. Cl. ........ 359/337.5; 359/340; 359/333
(58) Field of Classification Search ........ 359/333, 359/337.5, 340
See application file for complete search history.

(56) References Cited

U.S. PATENT DOCUMENTS

| 5,696,782 | A  | * | 12/1997 | Harter et al. ........ 372/25 |
| 5,847,863 | A  | * | 12/1998 | Galvanauskas et al. .. 359/341.3 |
| 6,792,188 | B2 | * | 9/2004  | Libori et al. ........ 385/125 |
| 2004/0179796 | A1 | * | 9/2004 | Jakobsen et al. ........ 385/123 |
| 2004/0190119 | A1 | * | 9/2004 | Tauser et al. ........ 359/333 |
| 2004/0213302 | A1 | * | 10/2004 | Fermann et al. ........ 372/6 |
| 2004/0258353 | A1 | * | 12/2004 | Gluckstad et al. ........ 385/28 |
| 2005/0147370 | A1 | * | 7/2005 | Yusoff et al. ........ 385/125 |
| 2005/0226278 | A1 | * | 10/2005 | Gu et al. ........ 372/6 |

FOREIGN PATENT DOCUMENTS

JP    2006332666 A    * 12/2006

OTHER PUBLICATIONS

Limpert et al. "All fiber CPA system based on air-guiding photonic bandgap fiber compressor", Conference on Lasers and Electro-Optics, 2004, vol. 2 (May 16-21, 2004).*

* cited by examiner

*Primary Examiner*—Eric Bolda
(74) *Attorney, Agent, or Firm*—Xin Wen

(57) ABSTRACT

A fiber Chirped Pulse Amplification (CPA) laser system includes a fiber mode-locking oscillator for generating a laser for projecting to a fiber stretcher for stretching a pulse width of the laser wherein the stretcher further comprising a self-phase modulation (SPM) assisted photonics crystal fiber (PCF) single mode (SM) fiber stretcher. The fiber CPA laser system further includes a multistage amplifier for amplifying the laser and a high-order dispersion-compensating compressor for compensating high order dispersions and compressing the pulse width of the laser.

24 Claims, 3 Drawing Sheets

Enhancement of pulse stretching in fiber laser

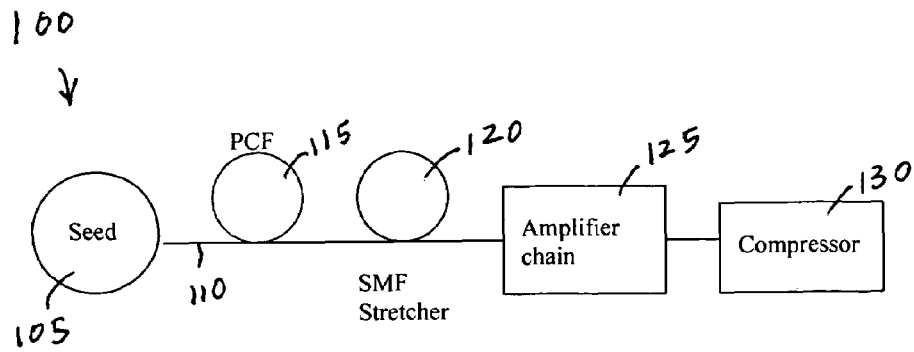
Figure 1 Enhancement of pulse stretching in fiber laser
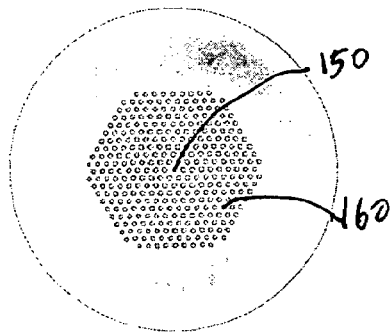
Fig. 2A
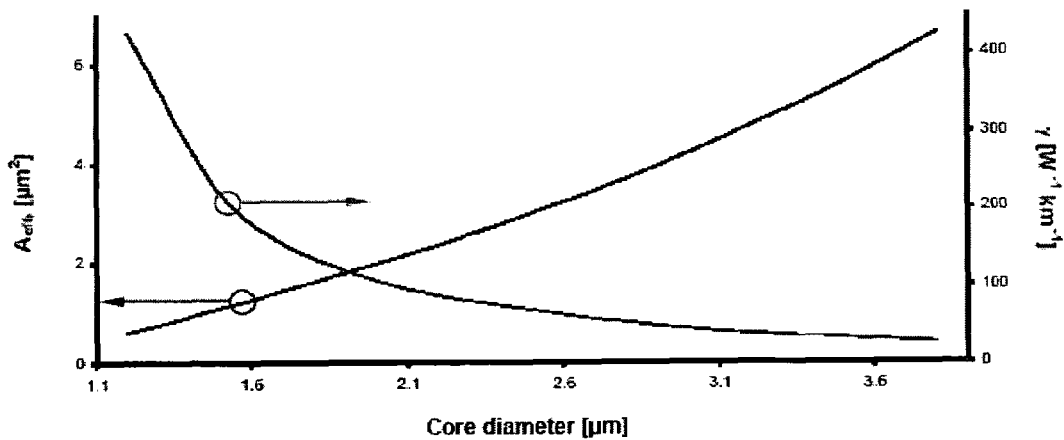
Fig. 2B
Figure 2 Nonlinear PCF fiber where Fig. 2A shows cross section of nonlinear PCF fiber and Fig. 2B shows the effective mode field area and nonlinearity coefficient Super-continuum generation pumped by a microchip laser 40 mW average power.

Replacement Drawing Sheets: 2

ALL FIBER LASER SOLUTION FOR SPECTRAL BROADENING AND PULSE STRETCHING IN A CHIRPED PULSE AMPLIFICATION FIBER SYSTEM

This Formal Application claims a Priority Date of Jun. 30, 2005 benefit from two Provisional Patent Applications 60/696,372 and Jul. 1, 2005 benefit from another Provisional Patent Application 60/696,275 filed by the same Applicant of this Application. The disclosures made in 60/696,372 and 60/696,275 are hereby incorporated by reference in this Patent Application.

FIELD OF THE INVENTION

The present invention relates generally to apparatuses and methods for providing pulsed fiber laser systems. More particularly, this invention relates to a system configuration for the enhancement of stretching ratio in a conventional fiber stretcher in high-energy short pulse fiber laser.

BACKGROUND OF THE INVENTION

Even though current technologies of fiber laser have made significant progress toward achieving a compact and reliable fiber laser system to project high quality output laser with ever increasing output energy, those of ordinary skill in the art are still confronted with technical limitations and difficulties. Specifically, the Chirped Pulse Amplification (CPA) laser system is of critical importance and often applied to generate short pulse high-energy laser pulses. In order to achieve the purpose of providing compact, reliable and high stable laser system, attempts are made to remove the free space components such as the grating lens combination for pulse chirping and de-chirping as that implemented in the conventional high-energy fiber laser systems. However, due to the small dispersion in the commonly available standard mode fibers and the relatively narrow bandwidth outputted directly from the fiber mode locking oscillator, a stretcher has to be implemented with long fiber. A fiber stretcher with longer length introduces additional problems due to a larger amount of third order dispersion. A long fiber stretcher also requires a compressor with longer length of grating pair for de-chirping, that requires large footprint of the whole system. A long fiber stretcher may further cause potential problems of system robustness, reliability and stability.

For example, a relatively narrow bandwidth directly from the fiber mode-locking oscillator, e.g., for Yb: fiber, center wavelength 1030 nm, bandwidth 8-15 nm, typically 10 nm, a conventional single mode (SM) fiber stretcher must be implemented with a long fiber in order to stretch the pulse to a few tens of pico-second (ps) or hundreds of ps. For a 1030 nm Yb fiber laser at a bandwidth of 10 nm, a fiber of 100 m fiber is employed to achieve a pulse width of 30 ps and a fiber of few hundred meter is employed to stretch the pulse width to more than 100 ps. While such a large stretching ratio is good for the control of nonlinear effect in the fiber amplifier chain, it is also leads to a serious problem due to the fact that it leaves large third-order dispersion uncompensated. The uncompensated TOD causes additional problems to the fiber laser system because the uncompensated third order dispersion (TOD) affects the compressibility of the amplified pulses. The greater the uncompensated TOD the lower the laser compressibility becomes. Actually, for current existing and demonstrated high-energy fiber laser system, the uncompensated TOD is a main issue, which makes it very difficult to achieve <200 fs high-energy pulses output.

Therefore, a need still exists in the art of fiber laser design and manufacture to provide a new and improved configuration and method to provide fiber laser to enhance the stretching ratio in the high-energy fiber laser system such that the above-discussed difficulty may be resolved.

SUMMARY OF THE PRESENT INVENTION

It is another aspect of this invention that a stretching fiber with reduced length reduces the distance between the components of the system significantly. Reduction of physical size of a fiber sistem is therefore achived in a laser system of this invention to increase the compactness that leads to significantly improved robustness, stability and reliability.

It is another aspect of this invention that the reduced stretching fiber length can also reduce the distance between the components of the grating compressor, thus the physical dimension of the system can be significantly reduced. Reduction of physical size of a fiber system is achievable to increase the compactness that leads to significantly improved robustness, stability and reliability.

It is another aspect of this invention that in order to further reduce the TOD and higher order dispersion, the fiber length of stretch must be reduced. The fiber length of the stretcher is reduced by enhancing a stretching ration with the implementation of a PCF that greatly increased the self phase modulation thus accomplish enhanced spectral broadening for the pulse stretching. With reduced fiber length a reduce TOD and higher order dispersions are accomplished and the above discussed problems and limitations of the prior art are resolved.

It is a further aspect of this invention to provide special mode matching splicing by applying a mode adapter for splicing the PCF with a common single mode fiber such that the SPM function of the SPF can be optimized. The mode adapting function provided by the mode adapter thus greatly enhancing the pulse stretching process thus reducing the required fiber length and resolves the problems and limitations of the TOD and higher order dispersions.

It is a further aspect of this invention that the manipulation of the optical spectrum in the CPA fiber amplifier achieves the purpose of reducing the higher order dispersions. For the coherent broadband short pulse, the spectral domain and the temporal domain are closely correlated. The non-linearity can modify the spectral phase, generate new spectral component; it largely improves the capability of the generation of a high-energy short pulse from the fiber laser system. This invention suggests a novel avenue to control the pulse compressibility by changing the spectral properties thus reducing the high order dispersion.

Briefly, in a preferred embodiment, the present invention discloses a fiber CPA laser system that includes a fiber Chirped Pulse Amplification (CPA) laser system. The fiber CPA laser system includes a fiber mode-locking oscillator for generating a laser for projecting to a fiber stretcher for stretching a pulse width of the laser wherein the stretcher further comprising a self-phase modulation (SPM) assisted photonics crystal fiber (PCF) single mode (SM) fiber stretcher. The fiber CPA laser system further includes a multistage amplifier for amplifying the laser and a high-order dispersion-compensating compressor for compensating high order dispersions and compressing the pulse width of the laser.

In a preferred embodiment, this invention further discloses a method for reducing the high order dispersion, shrinking the laser system footprint. This scheme is realized in an all fiber solution with a simple implementation. The system is very compact, reliable, robust and stable.

These and other objects and advantages of the present invention will no doubt become obvious to those of ordinary skill in the art after having read the following detailed description of the preferred embodiment, which is illustrated in the various drawing figures.

BRIEF DESCRIPTION OF THE DRAWINGS

FIG. 1 is a functional block diagram for showing a fiber laser system implemented with a spliced PCF for stretching ratio enhancement of this invention.

FIG. 2 is the cross section of the PCF fiber. It shows the cladding structure and the very small core. FIG. 2(b) shows the mode field area and the nonlinear coefficient of the PCF fiber.

DETAILED DESCRIPTION OF THE INVENTION

Figure 3:
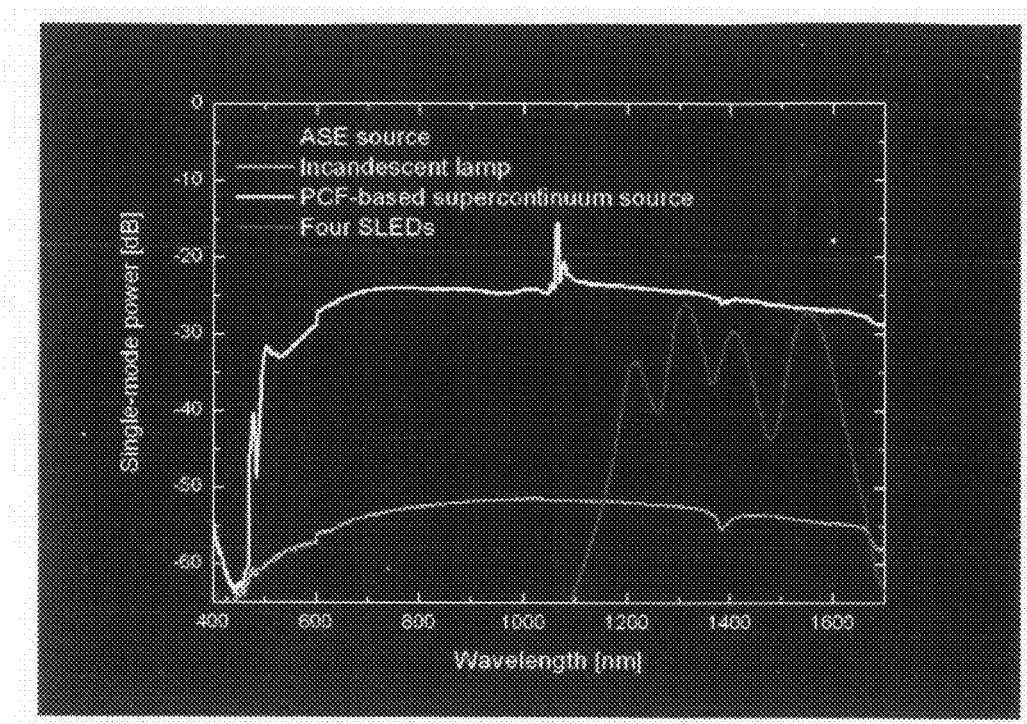
FIG. 3 shows a >1200 nm super-continuum generation pumped by a microchip laser, the power is as low as 40 mW average power.

Referring to FIG. 1 for a schematic diagram of a fiber laser system 100 of this invention that implements a common single mode fiber sliced with a photonics crystal fiber (PCF) for enhancement of the spectral broadening and pulse stretching functions of the fiber laser system. The laser system 100 includes a laser seed 105 that includes an oscillator for generating a fiber-based mode-locking laser pulse with an original pulse duration. The laser project from the oscillator of the seed laser 105 has a laser-pulse energy of the order of 0.1 nJ level. A common single mode fiber 110 is spliced with a photonics crystal fiber (PCF) 115. In an exemplary embodiment, the PCF 115 may be a PCF from Crystal Fiber, Denmark. The purpose of splicing the PCF 115 to the common single mode fiber 110 is to generate large bandwidth via self phase modulation (SPM). Since the single mode PCF 115 has a small field-mode diameter (~1.5 um), the SPM can be very large, and the bandwidth can be broadened to 100 nm. Then, the spectrally broadened pulse is projected into a common single mode fiber (SMF) 120 to stretch the spectrally broadened pulse.

In principle, SPM is a nonlinear phase modulation for a beam, caused by its own intensity via the Kerr effect. Due to the Kerr effect, the high optical intensities in a medium, e.g. an optical fiber, cause a nonlinear phase delay, which has the same temporal shape as the optical intensity. This can be described as a change of the refractive index:

$$\Delta n = n_2 I \quad (1)$$

with the nonlinear coefficient $n_2$ and the optical intensity I. If an optical pulse is transmitted through a medium, the Kerr effect causes a time-dependent phase shift according to the time-dependent pulse intensity. In the frequency domain, strong self-phase modulation (SPM) can lead to new frequency generation and spectral broadening.

On the other hand, the spectral broadening in laser medium is functionally related to many parameters, such as the dispersion, the pulse duration and the peak powers. In a short pulse application; the spectral broadening is most dominantly caused by SPM. In general, provided enough power, SPM can be very strong inside a drop of water, or even in the air. However, the nonlinear PCF offers very special properties, as zero-dispersion design and high nonlinearity, permits strong nonlinear interaction over a significant length of fiber.

FIG. 2A shows a highly nonlinear photonic crystal fiber that guides light in a small solid silica core 150, surrounded by a micro-structured cladding 160 formed by a periodic arrangement of air holes in silica. The optical properties of the core closely resemble those of a rod of glass suspended in air, resulting in strong confinement of the light and, correspondingly, a large nonlinear coefficient. The possibility of very small core sizes (diameters down to 1 μm) combined with a very large core/cladding index contrast (up to 0.4) enables us to create fibers with extremely small effective areas and high nonlinear coefficients. The effective mode area and the nonlinearity coefficient are defined as $$A_{eff} = \frac{\left(\int_{-\infty}^{+\infty} |E(x,y)|^2 dx dy\right)^2}{\int_{-\infty}^{+\infty} |E(x,y)|^4 dx dy} \quad (2)$$

$$\gamma = \frac{2\pi n_2}{A_{eff} \lambda}$$

where $n_2$ is the nonlinear refractive index, $E(x,y)$ is the transverse field distribution inside the core, sometimes it can be approximately written as the Gaussian distribution:

$$E(x, y) = \exp\left(-\frac{x^2 + y^2}{\omega^2}\right)$$

FIG. 2B shows the calculated effective mode area and the nonlinearity coefficient. As a high nonlinearity fiber, this fiber is ideal for the super-continuum (SC) generation. FIG. 3 shows the SC spectrum generated in the nonlinear PCF fiber. With as low as 40 mW average power (peak power of 40 KW) laser pulses, more than 1200 nm broadband SC was generated. Of course we do not want to generate such wide broadband since most of the unwanted bandwidth is useless during the following amplification stage; by fine tuning the input power level we can control the SC bandwidth within 100 nm, matching the gain bandwidth of the gain fiber.

Since the stretching ratio depends on the pulse bandwidth linearly, the stretching ratio will be largely increased for same length comparing with the conventional scheme. For example, a fiber laser of 1030 nm transmitted in an Yb fiber having a bandwidth of 100 nm requires a 10 m fiber to stretch the pulse to 30 ps and a fiber length ranging between 30 to 80 meters to stretch the pulse to more than 100 ps. Compared to the conventional laser system the pulse stretching process is greatly enhanced. For the same stretching ratio, a significantly reduced length of fiber is required for providing the spectral broadening and pulse stretching as that can be accomplished by the conventional laser systems. The reduced fiber length thus largely reduces the accompanying third-order dispersion (TOD) and higher order dispersion. With reduced TOD and higher order dispersions, the design requirements for the fiber laser compressor 130 for the amplified pulse by the amplifier 125 is significantly relaxed. The enhanced stretching ratio of this system provides additional benefit that even a pulse gain-narrowing effect is experienced by the laser projected through the amplifier 125 during an operation of a high power amplification, the amplified pulses still have enough bandwidth to support <200 fs pulse duration.

In principle, the gain narrowing refers to the phenomenon that the bandwidth of light can be reduced during amplification in a medium with limited gain bandwidth. It is simply the consequence of the fact that the center region of the Fourier spectrum experiences a higher gain than the spectral wings. This phenomenon is especially important for short pulse laser system due to the fact that the reduced bandwidth limits the application for laser of longer pulse width since the narrowing bandwidth reduces the compressibility achievable by a compressor. For this reason, an enhanced stretching ratio as well as a broadened spectrum as disclosed in this invention become critically important, particularly for high peak power and high gain amplification applications.

Gain narrowing effect exists widely in laser amplifiers, in particular for those with high gain and application to very short pulses. It is important to realize that the strength of the gain-narrowing effect depends not only on the gain bandwidth of the amplifier medium, but also on the input spectrum and the amount of gain. Apart from using a very broadband gain medium, one has to use some optical filter, which can to some extent compensate gain narrowing by introducing higher loss for those frequency components with highest gain. Also another way is to modify the input seed spectrum shape, such that the spectral components with higher gain have lower amplitude. In the implementation of the spectral broadening and pulse stretching, fine-tuning operation can be employed to adjust the input power level, and generate the required spectrum for the latter amplification.

Implementing this idea into the reality stimulates two issues. The first one is the generation of the adequate spectrum via PCF. The second relates to the coupling from SM fiber to PCF and PCF to SM fiber. The first one is mainly an experimental issue, which can be resolved practically. The second relies on the splicing and mode match.

Figure 4A:
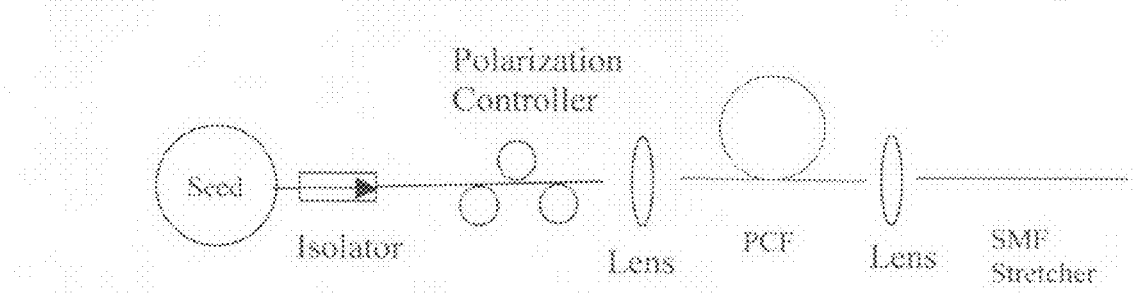
FIG. 4 shows schematic drawing of the coupling setup for the mode field matching in spectral broadening and pulse stretching with FIG. 4A shows a micro-optics coupling.
FIG. 4B shows a taped fiber as the mode field adaptor and FIG. 4C shows a specially splicing for mode field matching.
Figure 4B:
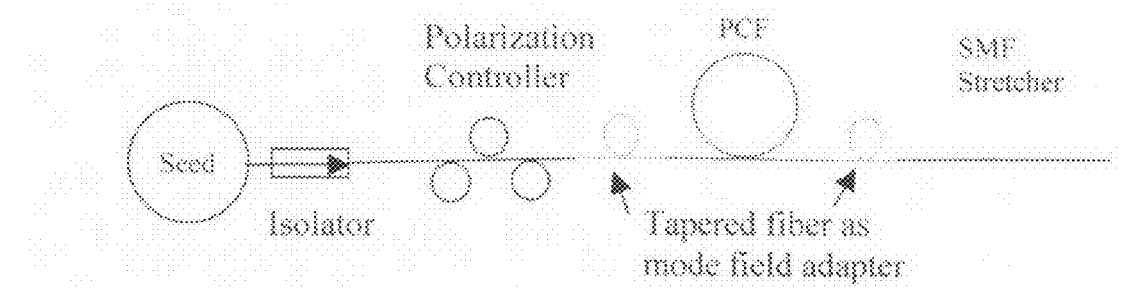
Figure 4C:
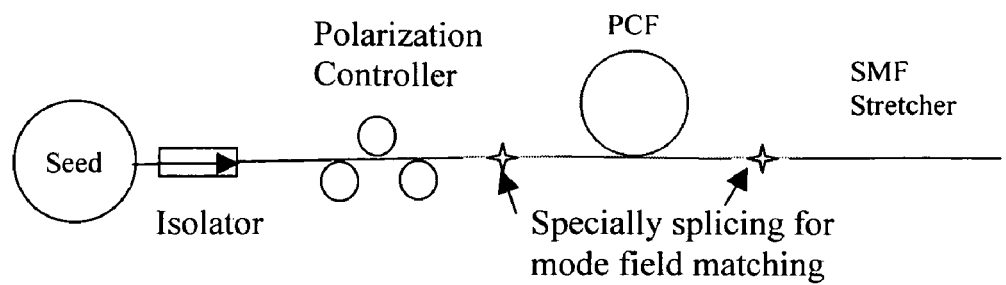

FIG. 4 shows schematic drawing of the coupling setup for the mode field matching in spectral broadening and pulse stretching. Specifically, FIG. 4A shows a micro-optics coupling, FIG. 4B shows a tapered fiber as the mode field adaptor and FIG. 4C shows a specially splicing for mode field matching. It has been experimentally demonstrated that the mode area adapter can largely reduce the insertion loss from single mode area fiber to PCF for spectral broadening and from PCF to single mode fiber for pulse stretching, the total loss can be reduced 3 dB, comparable with a conventional grating-lens stretcher. With this demonstration, this configuration provides a practical solution for an all fiber solution to achieve a high-energy short pulse CPA laser that has a pulse width less than 200 fs (<200 fs).

This system configuration is not limited to one-micron fiber laser and can apply to other wavelengths fiber lasers such as 1.55 micron, 2 micron and 3-5 micron. Although the descriptions focus on Yb and Nd fiber laser, in general, this principle can be applied to any short pulse fiber laser at any wavelength. Concurrently the vendors, such as Crystal Fibre A/S, offer nonlinear PCF fiber working wavelength range from visible to near IR. So this idea is suitable for all of the other fiber laser system, such as Er fiber laser. Further as long as the nonlinear PCF for other wavelengths, as 1.9 µm Tm and 2 µm Ho fiber laser, 3-5 µm ZEBLAN fiber laser, is manufactured, this idea can be widely applied and improve the performance of all of these types of fiber lasers. It can also apply to solid-state lasers. By using this all fiber-based stretcher, eliminating the conventional grating-lens stretcher, this idea leads toward a turnkey solid-state short pulse laser. For example, the Ti:Sapphire laser is the dominate short pulse laser system in the market. Most of the commercial systems utilize the conventional grating-lens combination for the stretcher. This largely limits the stability and reliability, increases the operation and maintenance difficulties. Actually it is the main drawback for this system to be widely implemented in the industrial area. Most of the customers come from research and development area. With the implementation of this idea into the Ti:Sapphire system, and other solid state short pulse CPA laser system, the solid state laser market can be dramatically extended.

According to the above descriptions and drawings, this invention discloses a fiber Chirped Pulse Amplification (CPA) laser system. The CPA laser system includes a fiber mode-locking oscillator for generating a laser for projecting to a fiber stretcher for stretching a pulse width of the laser wherein the stretcher further includes a self-phase modulation (SPM) assisted photonics crystal fiber (PCF) single mode (SM) fiber stretcher. The fiber CPA laser system further includes a multistage amplifier for amplifying the laser and a high-order dispersion-compensating compressor for compensating high order dispersions and compressing the pulse width of the laser. In a preferred embodiment, SPM assisted PCF-SM stretcher further includes a photonics crystal fiber (PCF) produced by a Demark producer Crystal Fiber. In another preferred embodiment, the SPM assisted PCF-SM stretcher further includes a PCF splicing to a common mode single mode (SM) fiber for generating a large bandwidth with a self phase modulation in the PCF. In another preferred embodiment, the SPM assisted PCF-SM stretcher further includes a PCF having a field mode diameter ranging from 1.0 to 5.0 micrometers. In another preferred embodiment, the SPM assisted PCF-SM stretcher further includes a PCF to broaden a bandwidth to approximately 20 nm to 100 nm. In another preferred embodiment, the SPM assisted PCF-SM stretcher further includes a nonlinear PCF with a zero-dispersion and high nonlinearity ranging from 10-200 $W^{-1}Km^{-1}$ enabling a strong nonlinear interaction over a significant length of the PCF fiber. In another preferred embodiment, the SPM assisted PCF-SM stretcher further includes a nonlinear PCF the nonlinear PCF further includes a small solid silica core surrounded by a micro-structured cladding formed by a periodic arrangement of air holes in silica. In another preferred embodiment, the small solid silica core resembling a glass rod suspended in air, resulting in a strong confinement of a light and a corresponding large nonlinear coefficient. In another preferred embodiment, the glass rod having a diameter ranging from 1.0 to 5.0 micrometers and the micro-structured cladding and the solid silica core forming a core/cladding index contrast up to 0.4 for creating a fiber of small effective area with a high nonlinear coefficient ranging from 10-200 $W^{-1}Km^{-1}$. In another preferred embodiment, the SPM assisted PCF-SM stretcher further includes a nonlinear PCF wherein the nonlinear PCF further generating a spectrum broadening. In another preferred embodiment, the SPM assisted PCF-SM stretcher further includes a nonlinear PCF wherein the nonlinear PCF further generating a spectrum broadening to more than 1000 nm for a laser power as low as 40 mW and a peak power of 40 KW. In another preferred embodiment, the SPM assisted PCF-SM stretcher further includes a nonlinear PCF wherein the nonlinear PCF further generating a spectrum broadening for adjusting an input power to control the broadened bandwidth within 100 nm for matching a gain bandwidth of a gain fiber of the multistage amplifier. In another preferred embodiment, the SPM assisted PCF-SM stretcher further includes a nonlinear PCF wherein the nonlinear PCF is mode field matched with a single mode fiber (SMF) stretcher by a micro-optics coupler. In another preferred embodiment, the SPM assisted PCF-SM stretcher further includes a nonlinear PCF wherein the nonlinear PCF is mode field matched with a single mode fiber (SMF) stretcher by a tapered splicing fiber. In another preferred embodiment, the SPM assisted PCF-SM stretcher further includes a nonlinear PCF wherein the nonlinear PCF is mode field matched with a single mode fiber (SMF) stretcher by a specially mode field matching splicing fiber. In another preferred embodiment, the fiber CPA laser system is configured for one-micron to five microns fiber laser. In another preferred embodiment, the fiber CPA laser system is configured as a Yb fiber laser system. In another preferred embodiment, the fiber CPA laser system is configured as a Nd fiber laser system. In another preferred embodiment, the fiber CPA laser system is configured as a short pulse fiber laser system for a wavelength ranging from 1010 nm to 1080 nm. In another preferred embodiment, the SPM assisted PCF-SM stretcher further includes a nonlinear PCF wherein the nonlinear PCF is provided to have a working wavelength ranging from a visible light to a near infrared (IR) wavelength. In another preferred embodiment, the fiber CPA laser system is configured as a Er fiber laser system. In another preferred embodiment, the fiber CPA laser system is configured as a Tm fiber laser system. In another preferred embodiment, the fiber CPA laser system is configured as a Ho fiber laser system. In another preferred embodiment, the fiber CPA laser system is configured as a ZEBLAN fiber laser system. In another preferred embodiment, the fiber CPA laser system is configured as a Ti:Sapphire laser fiber laser system.

Furthermore, this invention discloses a solid state laser system that includes a fiber stretcher for stretching a pulse width of a laser wherein the fiber stretcher further includes a self-phase modulation (SPM) assisted photonics crystal fiber (PCF) single mode (SM) fiber stretcher.

Additionally, this invention discloses a method for reducing a high order dispersion for shrinking laser system footprint. The method includes implementing a stretcher for stretching a pulse width of a laser by employing a self-phase modulation (SPM) assisted photonics crystal fiber (PCF) single mode (SM) fiber stretcher. In another preferred embodiment, the step of employing the SPM assisted PCF-SM stretcher further includes a step of splicing the PCF to a common mode single mode (SM) fiber for generating a large bandwidth with a self phase modulation in the PCF. In another preferred embodiment, the step of employing the SPM assisted PCF-SM stretcher further includes a step of employing a PCF having a field mode diameter ranging from 1.0 to 5.0 micrometers. In another preferred embodiment, the step of employing the SPM assisted PCF-SM stretcher further includes a step of employing the PCF to broaden a bandwidth to approximately 20 nm to 100 nm.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. An all-fiber-based Chirped Pulse Amplification (CPA) laser system comprising all fiber-based optical components further comprising:
    a fiber mode-locking oscillator configured for generating a laser pulse for projecting to a fiber stretcher configured for stretching a pulse width of said laser pulse, wherein said stretcher further comprising a self-phase modulation (SPM) assisted photonic crystal fiber (PCF) single mode (SM) fiber stretcher, wherein said SPM assisted PCF-SM stretcher further comprising a nonlinear PCF, wherein said nonlinear PCF further configured for generating a spectrum broadening to more than 1000 nm for a laser power as low as 40 mW and a peak power of 40 KW; and
    a multistage amplifier configured for amplifying said laser pulse and a high-order dispersion compensating compressor configured for compensating high-order dispersions and compressing said pulse width of said laser pulse.

2. The all fiber-based CPA laser system of claim 1 wherein:
said SPM assisted PCF-SM stretcher further comprising a mode adapter for mode-matched splicing to a common single mode fiber.

3. The all fiber-based CPA laser system of claim 1 wherein:
said SPM assisted PCF-SM stretcher further comprising a PCF splicing to a common mode single mode (SM) fiber for generating a large bandwidth with a self phase modulation in said PCF.

4. The all fiber-based CPA laser system of claim 1 wherein:
said SPM assisted PCF-SM stretcher further comprising a PCF having a field mode diameter ranging from 1.0 to 5.0 micrometers.

5. The all fiber-based CPA laser system of claim 1 wherein:
said SPM assisted PCF-SM stretcher further comprising a PCF to broaden a bandwidth to approximately 20 nm to 100 nm.

6. The all fiber-based CPA laser system of claim 1 wherein:
said SPM assisted PCF-SM stretcher further comprising a nonlinear PCF with a zero-dispersion and high nonlinearity ranging from 10-200 W-lKm−1 enabling a strong nonlinear interaction over a significant length of said PCF fiber.

7. The all fiber-based CPA laser system of claim 1 wherein:
said SPM assisted PCF-SM stretcher further comprising a nonlinear PCF said nonlinear PCF further comprising a small solid silica core surrounded by a micro-structured cladding formed by a periodic arrangement of air holes in silica.

8. The fiber-based CPA laser system of claim 7 wherein:
said small solid silica core resembling a glass rod suspended in air, resulting in a strong confinement of a light and a corresponding large nonlinear coefficient.

9. The all fiber-based CPA laser system of claim 8 wherein:
said glass rod having a diameter ranging from 1.0 to 5.0 micrometers and said micro-structured cladding and said solid silica core forming a core/cladding index contrast up to 0.4 for creating a fiber of small effective area with a high nonlinear coefficient ranging from 10-200 $W^{-1}Km^{-1}$.

10. The all fiber-based CPA laser system of claim 1 wherein:
said SPM assisted PCF-SM stretcher further comprising a nonlinear PCF wherein said nonlinear PCF further generating a spectrum broadening.

11. The all fiber-based CPA laser system of claim 1 wherein:
said SPM assisted PCF-SM stretcher farther comprising a nonlinear PCF configured to generate a spectrum having a broader bandwidth than said laser pulse.

12. The all fiber-based CPA laser system of claim 1 wherein:
said SPM assisted PCF-SM stretcher further comprising a nonlinear PCF wherein said nonlinear PCF is mode field matched with a single mode fiber (SMF) stretcher by a micro-optics coupler.

13. The all fiber-based CPA laser system of claim 1 wherein:
said SPM assisted PCF-SM stretcher further comprising a nonlinear PCF wherein said nonlinear PCF is mode field matched with a single mode fiber (SMF) stretcher by a tapered splicing fiber.

14. The all fiber-based CPA laser system of claim 1 wherein:
said SPM assisted PCF-SM stretcher further comprising a nonlinear PCF wherein said nonlinear PCF is mode field matched with a single mode fiber (SMF) stretcher by a specially mode field matching splicing fiber.

15. The all fiber-based CPA laser system of claim 1 wherein:
said fiber CPA laser system is configured for one-micron to five microns fiber laser.

16. The all fiber-based CPA laser system of claim 1 wherein:
said fiber CPA laser system is configured as a Yb fiber laser system.

17. The fiber CPA laser system of claim 1 wherein:
said fiber CPA laser system is configured as a Nd fiber laser system.

18. The all fiber-based CPA laser system of claim 1 wherein:
said fiber CPA laser system is configured as a short pulse fiber laser system for a wavelength ranging from 1010 nm to 1080 nm.

19. The all fiber-based CPA laser system of claim 1 wherein:
said SPM assisted PCF-SM stretcher further comprising a nonlinear PCF wherein said nonlinear PCF is provided to have a working wavelength ranging from a visible light to a near infrared (IR) wavelength.

20. The fiber CPA laser system of claim 1 wherein:
said fiber CPA laser system is configured as a Er fiber laser system.

21. The fiber CPA laser system of claim 1 wherein:
said fiber CPA laser system is configured as a Tm fiber laser system.

22. The fiber CPA laser system of claim 1 wherein:
said fiber CPA laser system is configured as a Ho fiber laser system.

23. The fiber CPA laser system of claim 1 wherein:
said fiber CPA laser system is configured as a ZEBLAN fiber laser system.

24. The fiber CPA laser system of claim 1 wherein:
said fiber CPA laser system is configured as a Ti: Sapphire laser fiber laser system.

* * * * *